(12) United States Patent
Takeuchi et al.

(10) Patent No.: US 8,472,160 B2
(45) Date of Patent: Jun. 25, 2013

(54) ELECTRONIC COMPONENT

(75) Inventors: Shunsuke Takeuchi, Nagaokakyo (JP);
Yoji Yamamoto, Nagaokakyo (JP);
Akihiro Motoki, Nagaokakyo (JP);
Makoto Ogawa, Nagaokakyo (JP);
Masahito Saruban, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 27 days.

(21) Appl. No.: 13/051,018

(22) Filed: Mar. 18, 2011

(65) Prior Publication Data
US 2011/0235232 A1 Sep. 29, 2011

(30) Foreign Application Priority Data

Mar. 29, 2010 (JP) .................................. 2010-075397

(51) Int. Cl.
*H01G 4/00* (2006.01)
*H01G 4/228* (2006.01)
*H01G 4/06* (2006.01)

(52) U.S. Cl.
USPC .................. 361/301.1; 361/306.3; 361/321.2; 361/321.3

(58) Field of Classification Search
USPC ....................... 361/306.3, 321.2, 321.3, 301.1
See application file for complete search history.

(56) References Cited

U.S. PATENT DOCUMENTS

| | | |
|---|---|---|
| 6,960,366 B2 | 11/2005 | Ritter et al. |
| 6,972,942 B2 | 12/2005 | Ritter et al. |
| 6,982,863 B2 | 1/2006 | Galvagni et al. |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |

(Continued)

FOREIGN PATENT DOCUMENTS

| | | |
|---|---|---|
| EP | 1 890 304 A1 | 2/2008 |
| JP | 2003-022929 A | 1/2003 |

(Continued)

OTHER PUBLICATIONS

Motoki et al.; "Multilayer Electronic Component and Method for Manufacturing Multilayer Electronic Component"; U.S. Appl. No. 12/055,372, filed Mar. 26, 2008.

(Continued)

*Primary Examiner* — Eric Thomas
*Assistant Examiner* — Arun Ramaswamy
(74) *Attorney, Agent, or Firm* — Keating & Bennett, LLP

(57) ABSTRACT

An electronic component includes a laminate including a plurality of insulating layers that are laminated on each other. A capacitor conductor is embedded in the laminate and includes an exposed portion exposed between the insulating layers at a predetermined surface of the laminate. An external electrode is provided on the predetermined surface by direct plating so as to cover the exposed portion. An outer edge of the external electrode is spaced away from the exposed portion by about 0.8 μm or more.

8 Claims, 8 Drawing Sheets

U.S. PATENT DOCUMENTS

| | | |
|---|---|---|
| 7,463,474 B2 | 12/2008 | Ritter et al. |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1* | 5/2008 | Kunishi et al. ............. 361/306.3 |
| 2008/0158774 A1 | 7/2008 | Trinh |
| 2009/0290280 A1* | 11/2009 | Takeuchi et al. .............. 361/303 |
| 2010/0118467 A1 | 5/2010 | Takeuchi et al. |

FOREIGN PATENT DOCUMENTS

| | | |
|---|---|---|
| JP | 2008-047907 A | 2/2008 |
| JP | 2008-187037 A | 8/2008 |
| JP | 2009-224802 A | 10/2009 |
| JP | 2010-118499 A | 5/2010 |

OTHER PUBLICATIONS

Motoki et al.; "Multilayer Electronic Component and Method for Manufacturing the Same"; U.S. Appl. No. 12/142,924, filed Jun. 20, 2008.

Takeuchi et al.; "Laminated Ceramic Electronic Component"; U.S. Appl. No. 12/616,844, filed Nov. 12, 2009.

Motoki et al.; "Multilayer Electronic Component and Method for Manufacturing the same"; U.S. Appl. No. 12/770,914, filed Apr. 30, 2010.

Motoki et al.; "Multilayer Electronic Component and Method for Manufacturing Multilayer Electronic Component"; U.S. Appl. No. 13/051,013, filed Mar. 18, 2011.

* cited by examiner

ELECTRONIC COMPONENT

BACKGROUND OF THE INVENTION

1. Field of the Invention

The present invention relates to an electronic component, and more particularly, to an electronic component including a laminate in which insulating layers are laminated on each other.

2. Description of the Related Art

A multilayer electronic component of the related art is disclosed in Japanese Unexamined Patent Application Publication No. 2008-47907. The multilayer electronic component includes a plurality of dielectric layers, a plurality of internal electrodes, and terminals. The dielectric layers and the internal electrodes are alternately laminated on each other. The terminals are external electrodes provided on side surfaces of a laminate including the dielectric layers. In the multilayer electronic component described above, the internal electrodes are exposed at the side surfaces of the laminate, and the terminals are formed by plating portions of the laminate at which the internal electrodes are exposed.

In the above-described multilayer electronic component, a dielectric material may be denatured by absorbing moisture in the air (hereinafter, referred to as "moisture absorption"). As a result, the insulating properties of the dielectric layers provided between the internal electrodes are degraded, and short circuiting may occur therebetween.

SUMMARY OF THE INVENTION

To overcome the problems described above, preferred embodiments of the present invention provide an electronic component which prevents degradation in properties thereof caused by moisture absorption of a laminate.

According to a preferred embodiment of the present invention, an electronic component is provided which includes a laminate including a plurality of insulating layers laminated to each other, a first internal conductor which is embedded in the laminate and which includes a first exposed portion exposed between the insulating layers at a predetermined surface of the laminate, and a first external electrode provided on the predetermined surface by direct plating so as to cover the first exposed portion. The first external electrode preferably includes an outer edge that is spaced away from the first exposed portion by approximately 0.8 µm or more, for example.

According to various preferred embodiments of the present invention, the properties of the electronic component are prevented from being degraded by moisture absorption of the laminate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, an electronic component according to preferred embodiments of the present invention will be described with reference to the drawings.

Figure 1:
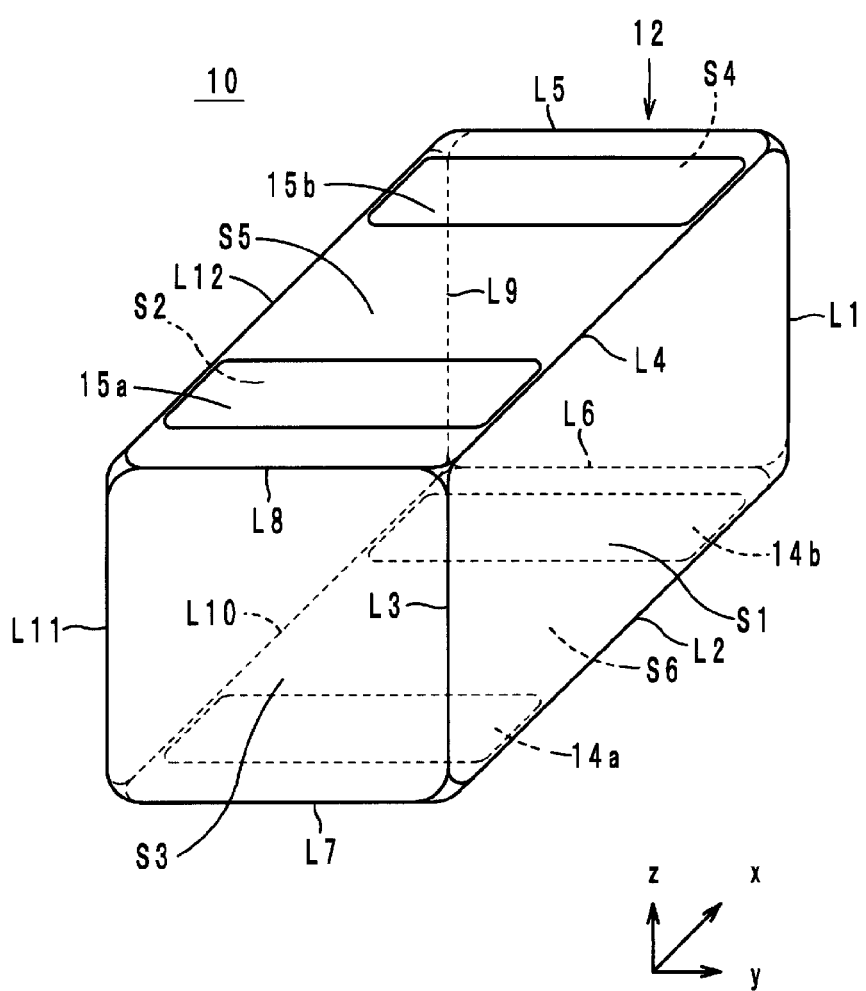
FIG. 1 is a perspective view of an electronic component according to a preferred embodiment of the present invention.
Figure 2:
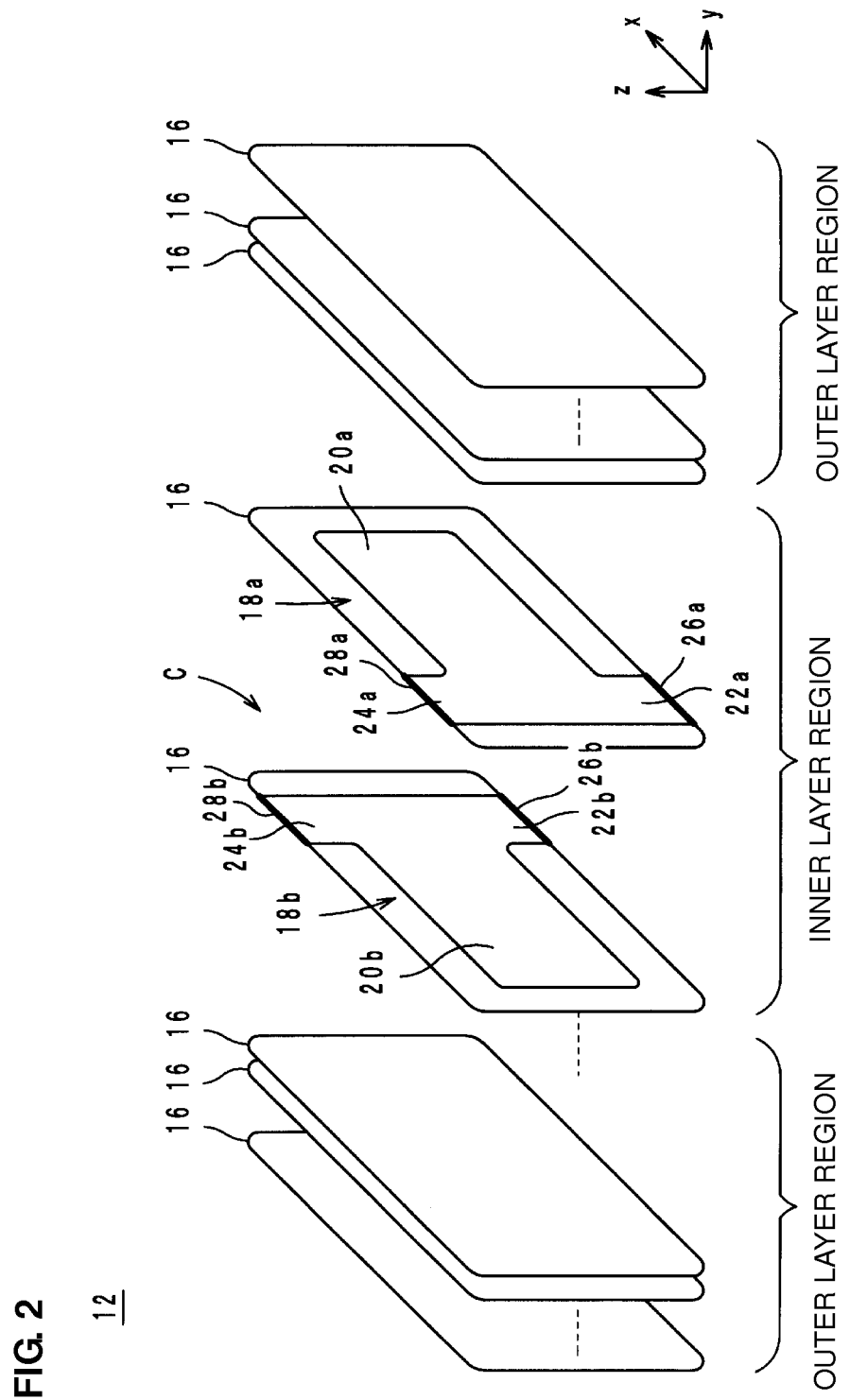
FIG. 2 is an exploded perspective view of a laminate of the electronic component according to a preferred embodiment of the present invention.

First, the structure of an electronic component according to a preferred embodiment of the present invention will be described with reference to the drawings. FIG. 1 is a perspective view of an electronic component 10. FIG. 2 is an exploded perspective view of a laminate 12 of the electronic component 10. In this preferred embodiment, a lamination direction of the laminate 12 is defined as a y axis direction. When the laminate 12 is viewed in plan in the y axis direction, a longer side direction of the laminate 12 is defined as an x axis direction. When the laminate 12 is viewed in plan in the y axis direction, a shorter side direction of the laminate 12 is defined as a z axis direction.

As shown in FIGS. 1 and 2, the electronic component 10 is preferably a chip capacitor which includes the laminate 12, external electrodes 14a, 14b, 15a, and 15b, and a capacitor C (not shown to FIG. 1). The laminate 12 preferably has a substantially rectangular parallelepiped shape, for example. However, since chamfering is performed, the laminate 12 preferably has substantially round-shaped corners and ridge lines, for example. Hereinafter, in the laminate 12, a surface at a positive direction side in the y axis direction is called a side surface S1, and a surface at a negative direction side in the y axis direction is called a side surface S2. In addition, a surface at a negative direction side in the x axis direction is called an end surface S3, and a surface at a positive direction side in the x axis direction is called an end surface S4. Furthermore, a surface at a positive direction side in the z axis direction is called an upper surface S5, and a surface at a negative direction side in the z axis direction is called a lower surface S6.

Furthermore, a shorter side of the side surface S1 at the positive direction side in the x axis direction is defined as a ridge line L1, a longer side of the side surface S1 at the negative direction side in the z axis direction is defined as a ridge line L2, a shorter side of the side surface S1 at the negative direction side in the x axis direction is defined as a ridge line L3, and a longer side of the side surface S1 at the positive direction side in the z axis direction is defined as a ridge line L4. In addition, a shorter side of the upper surface S5 at the positive direction side in the x axis direction is defined as a ridge line L5, and a shorter side of the lower surface S6 at the positive direction side in the x axis direction is defined as a ridge line L6. A shorter side of the lower surface S6 at the negative direction side in the x axis direction is defined as a ridge line L7, and a shorter side of the upper surface S5 at the negative direction side in the x axis direction is defined as a ridge line L8. A shorter side of the side surface S2 at the positive direction side in the x axis direction is defined as a ridge line L9, a longer side of the side surface S2 at the negative direction side in the z axis direction is defined as a ridge line L10, a shorter side of the side surface S2 at the negative direction side in the x axis direction is defined as a ridge line L11, and a longer side of the side surface S2 at the positive direction side in the z axis direction is defined as a ridge line L12.

As shown in FIG. 2, the laminate 12 is formed by laminating a plurality of insulating layers 16. Each of the insulating layers 16 preferably has a substantially rectangular shape and is formed from a dielectric ceramic. As an example of the dielectric ceramic, for example, $BaTiO_3$, $CaTiO_3$, $SrTiO_3$, or $CaZrO_3$ may preferably be used. In addition, at least one of the materials described above may preferably be used as a primary component, and at least one of a Mn compound, a Fe compound, a Cr compound, a Co compound, and a Ni compound, for example, may preferably be used as an accessory component. The thickness of the insulating layer 16 is preferably set in a range of about 0.5 μm to about 10 μm. Hereinafter, a primary surface of the insulating layer 16 at the positive direction side in the y axis direction is called a front surface, and a primary surface of the insulating layer 16 at the negative direction side in the y axis direction is called a rear surface.

As described above, the side surface S1 of the laminate 12 is defined by the surface of an insulating layer 16 provided at the most positive direction side in the y axis direction. The side surface S2 of the laminate 12 is defined by the rear surface of an insulating layer 16 provided at the most negative direction side in the y axis direction. In addition, the end surface S3 is defined by the shorter sides of the insulating layers 16 at the negative direction side in the x axis direction. The end surface S4 is defined by the shorter sides of the insulating layers 16 at the positive direction side in the x axis direction. The upper surface S5 is defined by the longer sides of the insulating layers 16 at the positive direction side in the z axis direction. The lower surface S6 is defined by the longer sides of the insulating layers 16 at the negative direction side in the z axis direction.

As shown in FIG. 2, the capacitor C includes internal capacitor conductors 18a and 18b embedded in the laminate 12. It is preferable that the internal capacitor conductors 18 be made, for example, of a conductive material, such as Ni, Cu, Ag, Pd, a Ag—Pd alloy, or Au, and have a thickness in a range of about 0.3 μm to about 2.0 μm.

The capacitor conductor 18a is provided on the surface of one insulating layer 16 and preferably includes a capacity portion 20a and lead portions 22a and 24a. The capacity portion 20a preferably has a substantially rectangular shape and is not in contact with an outer edge of the insulating layer 16. The lead portion 22a preferably protrudes toward the negative direction side in the z axis direction from the vicinity of an end portion at the negative direction side in the x axis direction of a longer side at the negative direction side in the z axis direction of the capacity portion 20a. Accordingly, the lead portion 22a extends to the longer side of the insulating layer 16 at the negative direction side in the z axis direction. Thus, preferably the lead portion 22a does not extend to a corner portion of the insulating layer 16 and is not provided on the ridge lines L1 to L12 of the laminate 12. At a front end portion at the negative direction side in the z direction, the lead portion 22a includes an exposed portion 26a exposed between adjacent two insulating layers 16 at the lower surface S6 of the laminate 12. The lead portion 24a preferably protrudes toward the positive direction side in the z axis direction from the vicinity of an end portion at the negative direction side in the x axis direction of a longer side at the positive direction side in the z axis direction of the capacity portion 20a. Accordingly, the lead portion 24a extends to the longer side of the insulating layer 16 at the positive direction side in the z axis direction. Accordingly, the lead portion 24a does not extend to a corner portion of the insulating layer 16 and is not provided on the ridge lines L1 to L12 of the laminate 12. At a front end portion at the positive direction side in the z direction, the lead portion 24a includes an exposed portion 28a exposed between the adjacent two insulating layers 16 at the upper surface S5 of the laminate 12.

The capacitor conductor 18b is preferably provided on the surface of one insulating layer 16 and includes a capacity portion 20b and lead portions 22b and 24b. The capacity portion 20b preferably has a substantially rectangular shape and is not in contact with an outer edge of the insulating layer 16. In addition, the capacity portion 20b is arranged to face the capacity portion 20a with the insulating layer 16 interposed therebetween. Accordingly, the capacity is generated between the capacity portions 20a and 20b. The lead portion 22b preferably protrudes toward the negative direction side in the z axis direction from the vicinity of an end portion at the positive direction side in the x axis direction of a longer side at the negative direction side in the z axis direction of the capacity portion 20b. Accordingly, the lead portion 22b extends to the longer side of the insulating layer 16 at the negative direction side in the z axis direction. Thus, the lead portion 22b does not extend to a corner portion of the insulating layer 16 and is not provided on the ridge lines L1 to L12 of the laminate 12. The lead portion 22b is located at the positive direction side in the x axis direction than the lead portion 22a. At a front end portion at the negative direction side in the z direction, the lead portion 22b includes an exposed portion 26b exposed between the adjacent two insulating layers 16 at the lower surface S6 of the laminate 12. The lead portion 24b preferably protrudes toward the positive direction side in the z axis direction from the vicinity of an end portion at the positive direction side in the x axis direction of a longer side at the positive direction side in the z axis direction of the capacity portion 20b. Accordingly, the lead portion 24b extends to the longer side of the insulating layer 16 at the positive direction side in the z axis direction. Thus, the lead portion 24b does not extend to a corner portion of the insulating layer 16 and is not provided on the ridge lines L1 to L12 of the laminate 12. The lead portion 24b is preferably located at the positive direction side in the x axis direction from the lead portion 24a. At a front end portion at the positive direction side in the z direction, the lead portion 24b includes an exposed portion 28b exposed between the adjacent two insulating layers 16 at the upper surface S5 of the laminate 12.

The capacitor conductors 18a and 18b are preferably provided on 445 insulating layers 16, for example, so as to be alternately disposed in the y axis direction. Accordingly, the capacitor C is provided at a portion at which the capacitor conductor 18a faces the capacitor conductor 18b with the insulating layer 16 interposed therebetween. In addition, a region in which the insulating layers 16 provided with the capacitor conductors 18 are laminated is called an inner layer region. In addition, at a positive direction side of the inner layer region in the y axis direction, insulating layers 16 each provided with no capacitor conductor 18 are preferably laminated. At a negative direction side of the inner layer region in the y axis direction, insulating layers 16 each provided with no capacitor conductor 18 are preferably laminated. Hereinafter, these two regions in which the insulating layers 16 provided with no capacitor conductor 18 are laminated are each called an outer layer region.

The external electrodes 14a and 14b are preferably provided directly on the lower surface S6 of the laminate 12 so as to cover the exposed portions 26a and 26b, respectively. However, the external electrodes 14a and 14b do not protrude from the lower surface S6 and are not provided on the ridge lines L1 to L12. The external electrode 14a is located at the negative direction side in the x axis direction from the external electrode 14b. The external electrodes 15a and 15b are preferably provided directly on the upper surface S5 of the laminate 12 so as to cover the exposed portions 28a and 28b, respectively. The external electrodes 15a and 15b do not protrude from the upper surface S5 and are not provided on the ridge lines L1 to L12. The external electrode 15a is located at the negative direction side in the x axis direction from the external electrode 15b. Since the external electrodes 14a, 14b, 15a, and 15b are arranged as described above, the capacity C is connected between the external electrodes 14a and 15a and the external electrodes 14b and 15b. The external electrodes 14a, 14b, 15a, and 15b may preferably be made of Cu, for example.

Figure 3:
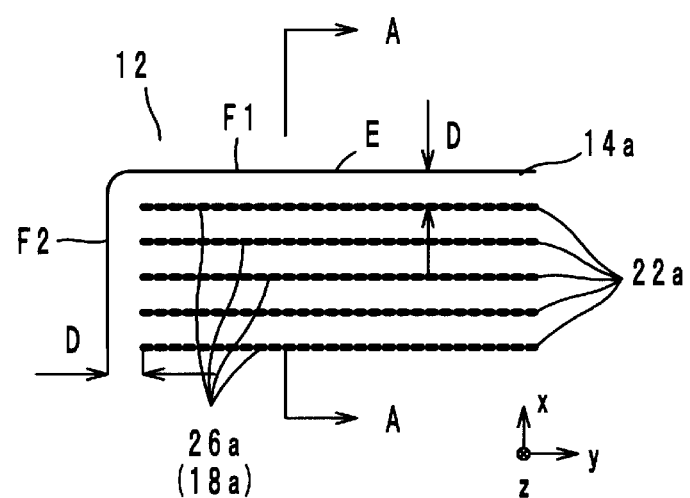
FIG. 3 is a plan view of an external electrode of the electronic component according to a preferred embodiment of the present invention.
Figure 4:
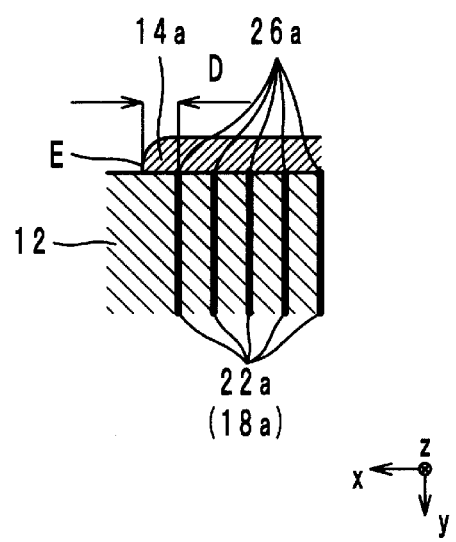
FIG. 4 is a cross-sectional view of the electronic component taken along the line A-A shown in FIG. 3.

The electronic component 10 is preferably configured such that degradation in properties caused by moisture absorption of the laminate 12 is prevented. Hereinafter, the external electrode 14a will be described by way of example. FIG. 3 is a plan view of the external electrode 14a of the electronic component 10. In FIG. 3, since the lead portions 22a are hidden by the external electrode 14a, the lead portions 22a are shown by dotted lines. FIG. 4 is a cross-sectional structural view of the electronic component 10 taken along the line A-A in FIG. 3.

As shown in FIGS. 3 and 4, the external electrode 14a preferably covers the exposed portions 26a of the lead portions 22a. That is, an outer edge E of the external electrode 14a preferably surrounds a portion in which the exposed portions 26a are provided. Hereinafter, a distance between the outer edge E of the external electrode 14a and the exposed portions 26a is represented by a distance D. As shown in FIGS. 3 and 4, the distance D between the outer edge E of the external electrode 14a and the exposed portions 26a indicates a distance between a portion F1 of the outer edge E parallel to the exposed portions 26a and an exposed portion 26a closest to the portion F1 and also indicates a distance between a portion F2 of the outer edge E perpendicular to the exposed portions 26a and an end portion of each of the exposed portions 26a.

In the electronic component 10 according to this preferred embodiment, the distance D is preferably approximately 0.8 μm or more, for example. That is, the outer edge E of the external electrode 14a is preferably located approximately 0.8 μm or more from the exposed portions 26a. Thus, the external electrode 14a extends approximately 0.8 μm or more from a portion of the laminate at which the exposed portions 26a are exposed to the lower surface S6.

In addition, in the electronic component 10, when the humidity resistance is taken into consideration, the outer edge E of the external electrode 14a is preferably extended as far as possible from the portion at which the exposed portions 26a are provided. However, in the electronic component 10, the external electrode 14a preferably does not protrude from the lower surface S6 and is not provided on the ridge lines L1 to L12. Thus, in the electronic component 10, the upper limit of the distance D between the outer edge E of the external electrode 14a and the exposed portions 26a is determined by the range in which the external electrode 14a does not protrude from the lower surface S6. In this preferred embodiment, the upper limit of the distance D is preferably about 55.4 μm, for example. Since the external electrodes 14b, 15a, and 15b also have the same structure as that of the external electrode 14a, a detailed description thereof is omitted.

The electronic component 10 is preferably mounted on a circuit board. In particular, the lower surface S6 on which the external electrodes 14a and 14b are provided or the upper surface S5 on which the external electrodes 15a and 15b are provided is preferably used as a mounting surface and is disposed to face the circuit board. Subsequently, the external electrodes 14a and 14b or the external electrodes 15a and 15b are soldered to lands provided on the circuit board. Accordingly, the electronic component 10 is mounted on the circuit board.

Next, a method for manufacturing the electronic component 10 will be described with reference to FIGS. 1 to 3.

After $BaTiO_3$, $CaTiO_3$, $SrTiO_3$ or $CaZrO_3$, for example, preferably used as a primary component and a Mn compound, a Fe compound, a Cr compound, a Co compound, or a Ni compound, for example, preferably used as an accessory component are weighed at a predetermined ratio and are then charged in a ball mill, wet mixing is performed. After an obtained mixture is dried and is then pulverized, an obtained powder is calcined. After a calcined powder is wet-pulverized, drying and pulverizing are sequentially performed, so that a dielectric ceramic powder is obtained.

To this dielectric ceramic powder, an organic binder and an organic solvent are preferably added, and mixing is then performed using a ball mill, for example. After a ceramic slurry is formed into sheets on a carrier sheet by, for example, a doctor blade method, drying is performed so as to form ceramic green sheets which are to be formed into the insulating layers 16. The thickness of each ceramic green sheet which is to be formed into the insulating layer 16 is preferably in a range of about 0.5 μm to about 10 μm.

Next, the capacitor conductors 18a and 18b are formed on the ceramic green sheets which are to be formed into the insulating layers 16 preferably by applying a paste including a conductive material using a method, such as a screen printing or a photolithographic method, for example. As the paste including a conductive material, for example, a paste formed by adding an organic binder and an organic solvent to a metal powder may be used.

Next, the ceramic green sheets which are to be formed into the insulating layers 16 are laminated, so that a green mother laminate is obtained. Subsequently, pressure bonding is preferably performed on the green mother laminate by a hydrostatic pressure press.

Next, the green mother laminate is preferably cut into a plurality of green laminates 12 each having a predetermined size. Subsequently, a barrel polishing process is preferably performed on the surfaces of the laminate 12, so that the corners and the ridge lines L1 to L12 of the laminate 12 are chamfered.

Next, the green laminate 12 is fired. As a firing temperature, for example, a temperature in a range of approximately 900° C. to approximately 1,300° C. is preferable. With the steps described above, a fired laminate 12 in which the capacitor conductors 18 are embedded is prepared.

Next, the external electrodes 14a, 14b, 15a, and 15b are preferably formed by a plating method. In this preferred embodiment, the external electrodes 14a, 14b, 15a, and 15b are preferably formed by two methods, that is, a strike plating method and a thick layer plating method.

The strike plating method is a method performed for a short time in order to improve the adhesion and/or covering properties of a plating layer. In the strike plating method, the laminate 12 is charged in a barrel including conductive media. Next, the barrel is immersed in a plating solution and is then rotated for a predetermined time. Accordingly, the conductive media come into contact with the exposed portions 26a, 26b, 28a, and 28b, so that an electrical power is supplied.

In the thick layer plating method, the laminate 12 is charged in a barrel including conductive media. Next, the barrel is immersed in a plating solution and is then rotated for a predetermined time. Accordingly, the conductive media come into contact with the exposed portions 26a, 26b, 28a, and 28b, so that an electrical power is supplied.

With the plating methods described above, the external electrodes 14a, 14b, 15a, and 15b are formed on and around the exposed portions 26a, 26b, 28a and 28b preferably to have a thickness of approximately 5 µm, for example. In addition, by adjusting the processing time for the strike plating method and that for the thick layer plating method, the distance D shown in FIGS. 3 and 4 can be adjusted. With the steps described above, the electronic component 10 is completed.

With the electronic component 10, degradation in properties thereof caused by moisture absorption of the laminate 12 is prevented. Particularly, in the multilayer electronic component disclosed in Japanese Unexamined Patent Application Publication No. 2008-47907, the dielectric material may be denatured by moisture absorption. As a result, the insulating properties of the dielectric layers provided between the internal electrodes are degraded, and short circuiting may occur therebetween.

In the electronic component 10 of this preferred embodiment, the external electrodes 14a, 14b, 15a, and 15b function to prevent moisture absorption of the insulating layers 16 located directly thereunder. Thus, in the electronic component 10, the external electrodes 14a, 14b, 15a, and 15b extend by approximately 0.8 µm or more from the portions at which the exposed portions 26a, 26b, 28a, and 28b are exposed to the upper surface S5 and the lower surface S6. Accordingly, moisture absorption of the insulating layers 16 provided between the capacitor conductors 18 is effectively prevented. As a result, in the electronic component 10, degradation in properties thereof caused by moisture absorption of the laminate 12 is effectively prevented.

In addition, in the electronic component 10, the generation of appearance defects of the external electrodes 14a, 14b, 15a, and 15b can be prevented as described below. In more particular, in the electronic component 10, the external electrodes 14a, 14b, 15a, and 15b are preferably formed by a plating method so as to cover the exposed portions 26a, 26b, 28a, and 28b. In addition, when the processing time for the plating method is increased, the distances D between the outer edges E of the external electrodes 14a, 14b, 15a, and 15b and the exposed portions 26a, 26b, 28a, and 28b can be increased. Accordingly, the external electrodes 14a, 14b, 15a, and 15b may preferably be formed, for example, on the ridge lines L2, L4, L10, and L12.

In this preferred embodiment, when the external electrodes 14a, 14b, 15a, and 15b are formed by a plating method, a plating solution penetrates between the external electrodes 14a, 14b, 15a, and 15b and the laminate 12. The plating solution as described above can be removed by a heat treatment. However, as described below, when the external electrodes 14a, 14b, 15a, and 15b are formed on the ridge lines L2, L4, L10, and L12, an appearance defect called a blister may occur.

During the heat treatment, the external electrodes 14a, 14b, 15a, and 15b are preferably heated to a greater extent than the laminate 12. Thus, although large heat shrinkage occurs in the external electrodes 14a, 14b, 15a, and 15b, large heat shrinkage does not occur in the laminate 12. Thus, at the ridge lines L2, L4, L10, and L12, the external electrodes 14a, 14b, 15a, and 15b generate a force so as to clamp to the laminate 12. Accordingly, the external electrodes 14a, 14b, 15a, and 15b are more securely adhered to the laminate 12 at the ridge lines L2, L4, L10, and L12 than at the upper surface S5 and the lower surface S6. Thus, a plating solution vaporized during the heat treatment is preferably confined between the external electrodes 14a, 14b, 15a, and 15b and the laminate 12 at the ridge lines L2, L4, L10, and L12. As a result, the external electrodes 14a, 14b, 15a, and 15b are peeled away from the laminate 12 by the vaporized plating solution so as to generate blisters. That is, the external electrodes 14a, 14b, 15a, and 15b have appearance defects.

Thus, in the electronic component 10, the external electrodes 14a, 14b, 15a, and 15b are preferably not provided on the ridge lines L2, L4, L10, and L12. Accordingly, the external electrodes 14a, 14b, 15a, and 15b are prevented from having appearance defects. In addition, in this preferred embodiment, chamfering is preferably performed on the electronic component 10 by the barrel polishing process. Thus, the ridge lines L1 to L12 of the electronic component 10 have substantially round shapes due to the chamfering.

In order to more confirm the advantages of the electronic component 10, the inventors of the present invention performed the following experiments. In particular, seven types of electronic components having the following conditions were formed.

Dimensions: about 1.0 mm×about 0.5 mm×about 0.5 mm
Material for an insulating layer: Barium titanate-based dielectric ceramic
Number of insulating layers: 475 layers
Number of insulating layers in an inner layer region: 445 layers
Number of insulating layers in each outer layer region: 15 layers
Thickness of each insulating layer: about 0.7 µm
Material for a capacitor conductor: A metal including Ni as a primary component.
Rated voltage: about 4.0 V
Electrostatic capacitance: about 10 µF The barrel polishing-process conditions for forming the seven types of electronic components are shown below.
Operation method: Wet barrel polishing
Number of revolutions: about 250 rpm
Media: Zirconia ball (about 1.0 mm in diameter)
POT volume: about 340 cc
Time: about 30 minutes One example of conditions of a strike plating method for forming the seven types of electronic components is shown below.
Plating solution: Copper pyrophosphate (about 14 g/L), potassium pyrophosphate (about 120 g/L), potassium oxalate (about 10 g/L)
Bath temperature: about 25° C.
pH: about 8.5
Barrel: Horizontal rotation barrel
Number of revolutions: about 10 rpm
Diameter of conductive media: about 0.5 mm
Current density: about 0.11 A/dm$^2$
Time: about 30 minutes One example of conditions of a thick layer plating method for forming the seven types of electronic components is shown below.
Plating solution: "Pyrobright process (Pyrobright PY-61 bath)" manufactured by Uyemura & CO., LTD.
Bath temperature: about 55° C.

pH: about 8.8
Barrel: Horizontal rotation barrel
Number of revolutions: about 10 rpm
Diameter of conductive media: about 0.5 mm
Current density: about 0.30 A/dm$^2$
Time: about 60 minutes Among the seven types of electronic components, the distance D shown in FIGS. 3 and 4 was changed as shown in Table 1 below. In order to change the distance D, the processing time for the strike plating method and the processing time for the thick layer plating method were changed as shown in Table 1. Table 1 shows the relationship between the distance D and the processing times of the first to the fifth examples and the first and the second comparative examples.

TABLE 1

| | Distance D (μm) | Time for Strike Plating Method (min) | Time for Thick Layer Plating Method (min) |
|---|---|---|---|
| First Example | 0.8 | 0 | 12 |
| Second Example | 5.3 | 0 | 75 |
| Third Example | 16.2 | 30 | 60 |
| Fourth Example | 34.1 | 60 | 50 |
| Fifth Example | 55.4 | 110 | 30 |
| First Comparative Example | 0.7 | 0 | 10 |
| Second Comparative Example | 63.8 | 130 | 30 |

A humidity resistance test was performed on each of the electronic components of the first to the fifth examples and the first and the second comparative examples, and the generation of appearance defects was also checked. For the humidity resistance test, 100 electronic components of each of the first to the fifth examples and the first and second comparative examples were formed, and a pressure cooker bias test (PCBT) was performed on 70 out of 100 electronic components each at a temperature of about 125° C., a relative humidity of about 95%, and a voltage of about 2.0 V for about 72 hours. Subsequently, the resistance between the external electrodes was measured, and an electronic component having a resistance of about 1 MΩ or less was determined to be defective. In addition, in order to check the generation of appearance defects, the generation of blisters of all of 100 electronic components was checked by visual inspection. Table 2 shows experimental results, and the defect rate of the humidity resistance test and that of the appearance check are shown.

TABLE 2

| | Defect Rate of Humidity Resistance Test | Defect Rate of Appearance Check | Judgment |
|---|---|---|---|
| First Example | 0/70 | 0/100 | ○ |
| Second Example | 0/70 | 0/100 | ○ |
| Third Example | 0/70 | 0/100 | ○ |
| Fourth Example | 0/70 | 0/100 | ○ |
| Fifth Example | 0/70 | 0/100 | ○ |
| First Comparative Example | 1/70 | 0/100 | X |
| Second Comparative Example | 0/70 | 1/100 | X |

According to Table 2, in the first to the fifth examples in which the distance D is in a range of about 0.8 μm to about 55.4 μm, no electronic components were found to be defective in the humidity resistance test and the appearance check. On the other hand, in the electronic component in which the distance D was about 0.7 μm, a defect was generated in the humidity resistance test. In addition, in the electronic component in which the distance D was about 63.8 μm, an appearance defect was generated. Accordingly, the distance D is preferably in a range of about 0.8 μm to about 55.4 μm.

Figure 5:
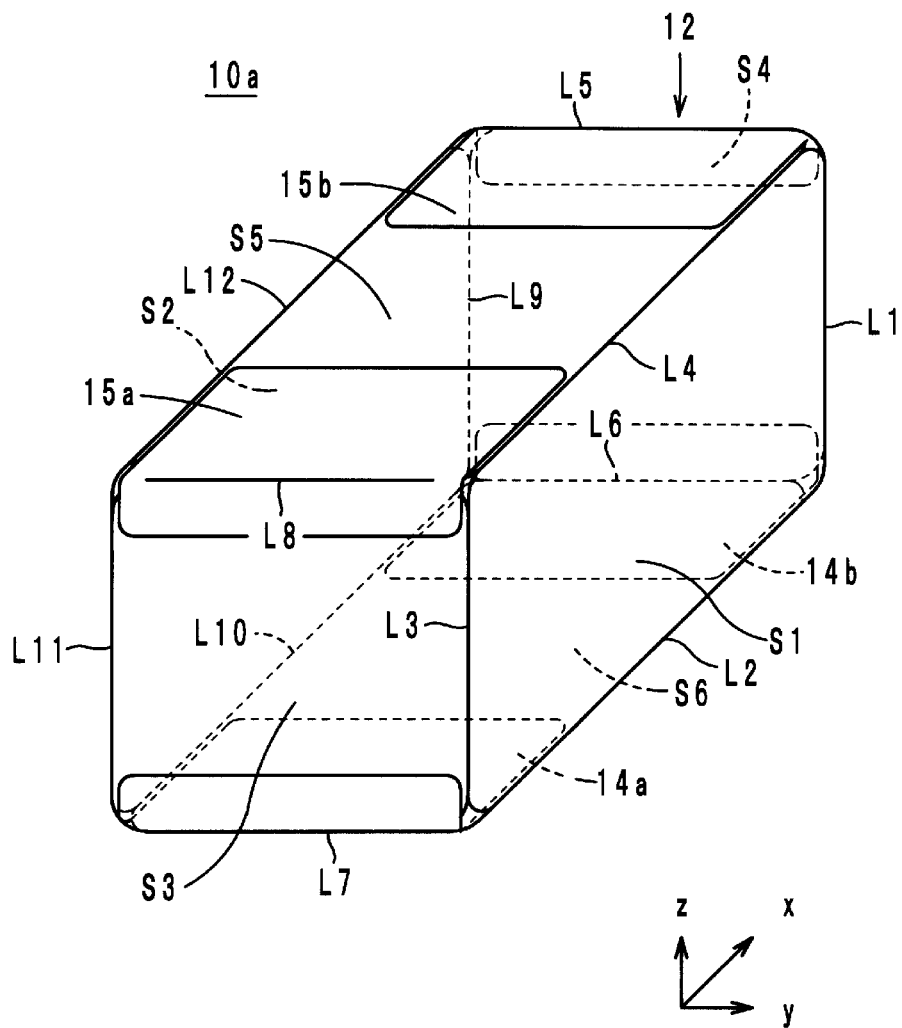
FIG. 5 is a perspective view of an electronic component according to a modified preferred embodiment of the present invention.
Figure 6:
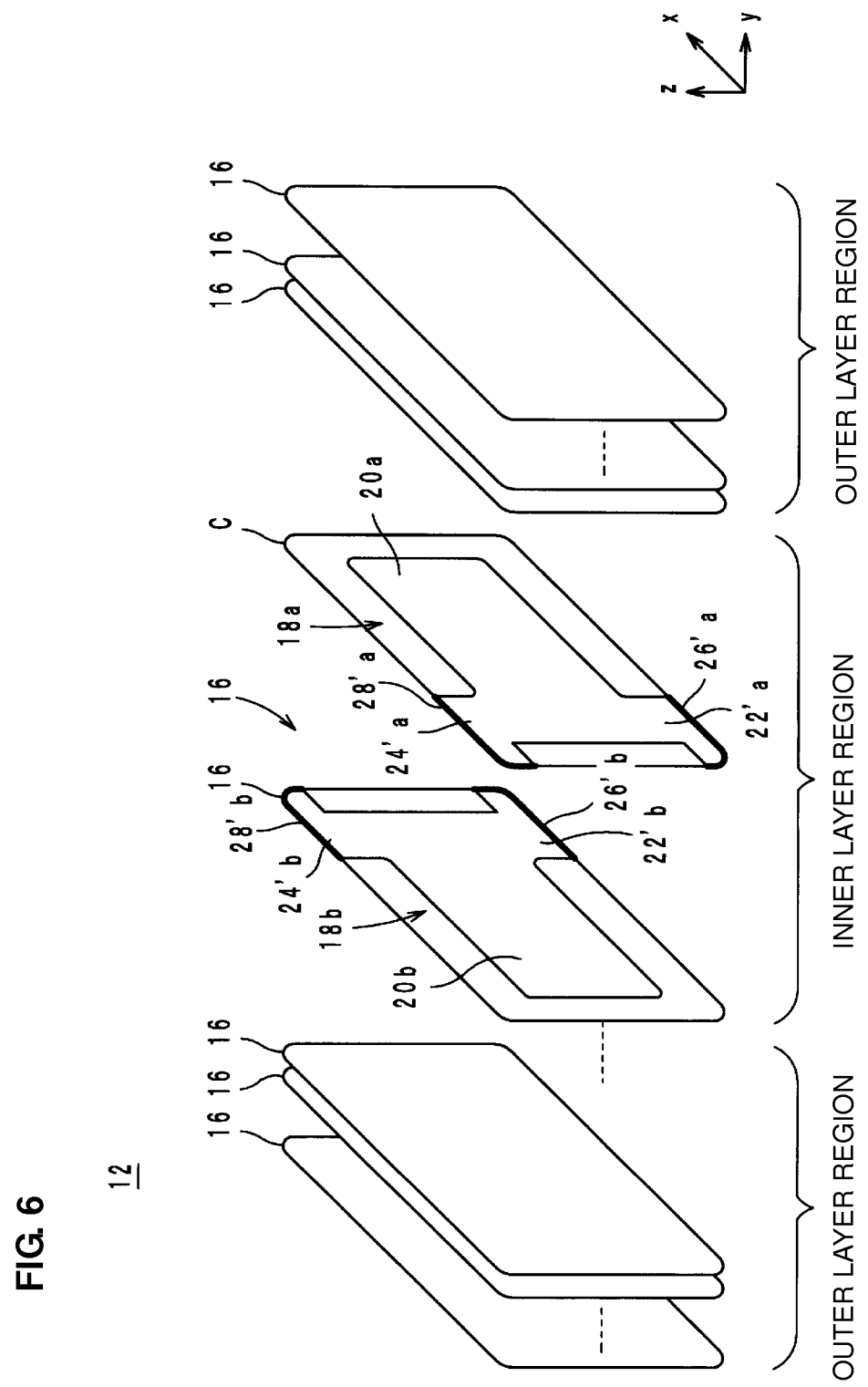
FIG. 6 is an exploded perspective view of a laminate of the electronic component according to the modified preferred embodiment of the present invention.

Hereinafter, an electronic component 10a according to a modified preferred embodiment of the present invention will be described with reference to the drawings. FIG. 5 is an appearance perspective view of the electronic component 10a according to the modified preferred embodiment. FIG. 6 is an exploded perspective view of the laminate 12 of the electronic component 10a according to the modified preferred embodiment.

Between the electronic component 10 and the electronic component 10a, the shapes of the external electrodes 14a, 14b, 15a, and 15b and the shapes of the capacitor conductors 18 are different from each other. More specifically, in the electronic component 10a, a lead portion 22'a preferably extends to the longer side of the insulating layer 16 at the negative direction side in the z axis direction and also preferably extends to the shorter side of the insulating layer 16 at the negative direction side in the x axis direction. In addition, the lead portion 22'a also preferably extends to a corner portion at which the longer side and the shorter side intersect with each other. As in the case of the lead portion 22'a, each of the lead portions 22'b, 24'a, and 24'b also preferably extend to the longer side and the shorter side of the corresponding insulating layer 16 and to a corner portion at which the longer side and the shorter side intersect with each other. The capacitor conductors 18a and 18b described above are provided on the ridge lines L5 to L8.

The external electrodes 14a, 14b, 15a, and 15b are preferably arranged so as to cover exposed portions 26' and 28' of the capacitor conductors 18. Thus, the external electrodes 14a, 14b, 15a, and 15b are preferably provided on the ridge lines L5 to L8. That is, among the ridge lines L1 to L12 of the electronic component 10a, the capacitor conductors 18 are preferably provided on only the ridge lines L5 to L8.

Even in the electronic component 10a as described above, degradation in properties thereof caused by moisture absorption of the laminate 12 are effectively prevented as in the electronic component 10.

Furthermore, in the electronic component 10a, although the external electrodes 14a, 14b, 15a, and 15b are provided on the ridge lines L5 to L8, the generation of appearance defects are prevented. More specifically, the external electrodes 14a, 14b, 15a, and 15b are preferably connected to the capacitor conductors 18a and 18b at the ridge lines L5 to L8. Thus, during a heat treatment performed to remove a plating solution, the external electrodes 14a, 14b, 15a, and 15b are prevented from shrinking. As a result, a plating solution vaporized during the heat treatment is prevented from being confined between the external electrodes 14a, 14b, 15a, and 15b and the laminate 12 at the ridge lines L2, L4, L10, and L12. Accordingly, in the electronic component 10a, although the external electrodes 14a, 14b, 15a, and 15b are provided on the ridge lines L5 to L8, the generation of appearance defects is effectively prevented.

The present invention is not limited to the preferred embodiments described above and may be modified within the scope of the present invention.

Figure 7:
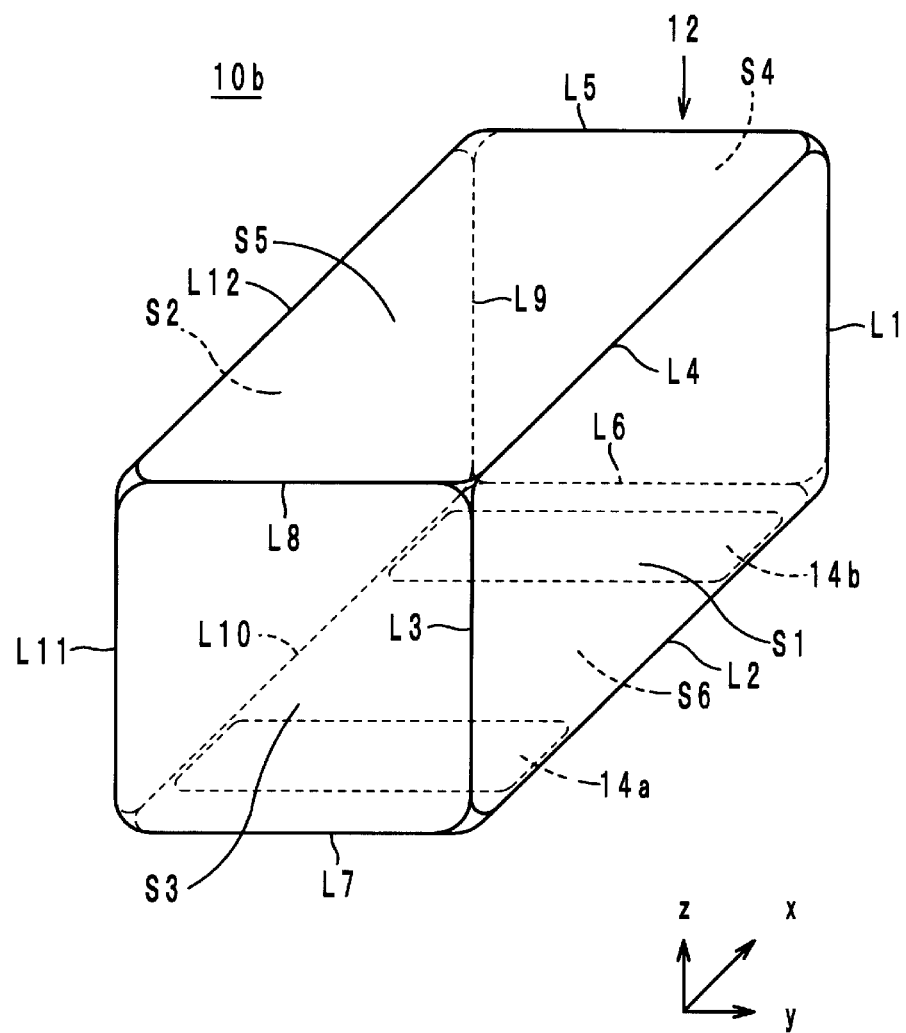
FIG. 7 is a perspective view of an electronic component according to another modified preferred embodiment of the present invention.
Figure 8:
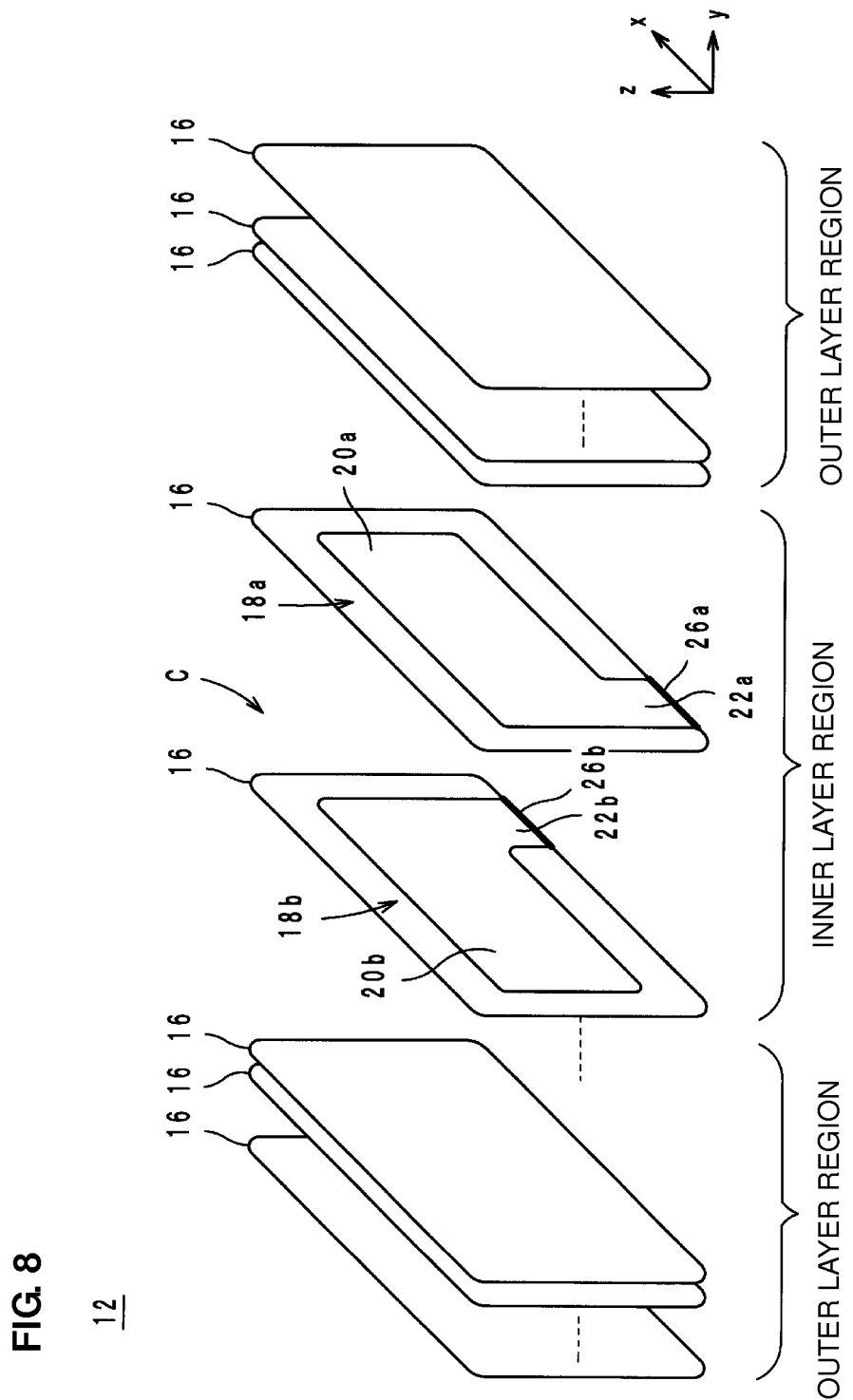
FIG. 8 is an exploded perspective view of a laminate of the electronic component according to another modified preferred embodiment of the present invention.

FIG. 7 is a perspective view of an electronic component 10b according to another modified preferred embodiment of the present invention. FIG. 8 is an exploded perspective view of the laminate 12 of the electronic component 10b according to the another modified preferred embodiment. As shown in the electronic component 10b of FIG. 7, the external electrodes 15a and 15b may preferably not be provided. In this case, as shown in FIG. 8, the lead portions 24a and 24b are also preferably not provided.

In addition, in the electronic components 10, 10a, and 10b, the circuit element embedded in the laminate 12 is not limited to the capacitor C. Thus, as the circuit element, a piezoelectric component, a resistor, a coil, a thermistor, or other suitable circuit element, for example, may preferably be used. When the circuit element is a piezoelectric component, for example, a piezoelectric crystal ceramic, such as a PZT-based ceramic, may preferably be used as a material for the insulating layer 16. In addition, when the circuit element is a thermistor, for example, a ceramic, such as a spinel-based ceramic, may preferably be used as a material for the insulating layer 16. Furthermore, when the circuit element is a coil, for example, a magnetic ceramic may preferably be used as a material for the insulating layer 16.

In addition, although being formed by a plating method as described above, the external electrodes 14a, 14b, 15a, and 15b may preferably be formed by performing a plating method twice. In particular, after an underlayer plating film is formed by a first plating method, an upper layer plating film is then formed on the underlayer plating film by a second plating method. A material for the underlayer plating film and the upper layer plating film is preferably a metal selected from the group consisting of Cu, Ni, Sn, Pb, Au, Ag, Pd, Bi, and Zn or an alloy formed of at least two thereof, for example. When Ni is used as a material for the capacitor conductor 18, Cu, for example, which has good compatibility with Ni, is preferably used as the material for the underlayer plating film. In addition, the upper layer plating film may have a two-layered structure which includes a first upper layer plating film and a second upper layer plating film. As a material for the first upper layer plating film in contact with the underlayer plating film, Ni, for example, which is not likely to be eroded by a solder, is preferably used. In addition, as a material for the second upper layer plating film exposed to the outside, Sn or Au, for example, which is excellent in solder wettability, is preferably used. The thicknesses of the underlayer plating film, the first upper layer plating film, and the second upper layer plating film are each preferably in a range of about 1 μm to about 15 μm.

As described above, the present invention is effectively applied to electronic components and is particularly superior since degradation in properties thereof caused by moisture absorption of a laminate is prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a laminate including a plurality of insulating layers laminated on each other;
   a first internal conductor embedded in the laminate and including a first exposed portion exposed between respective ones of the plurality of insulating layers at a predetermined surface of the laminate; and
   a first plated external electrode provided directly on the predetermined surface by direct plating so as to cover the first exposed portion; wherein
   the first external electrode includes an outer peripheral edge that is spaced away from the first exposed portion by about 0.8 μm or more;
   the first exposed portion is arranged closer to the outer peripheral edge of the first external electrode than any other exposed portions of internal conductors embedded in the laminate; and
   the first internal conductor and the first external electrode are not provided on ridge lines of the laminate at which respective sides of the laminate are connected.

2. The electronic component according to claim 1, further comprising:
   a second internal conductor embedded in the laminate and including a second exposed portion exposed between respective ones of the plurality of insulating layers at a predetermined surface of the laminate; and
   a second plated external electrode provided directly on the predetermined surface by direct plating so as to cover the second exposed portion; wherein
   the second external electrode includes an outer edge that is spaced away from the second exposed portion by about 0.8 μm or more.

3. The electronic component according to claim 2, wherein the first internal conductor and the second internal conductor define a capacitor at a location at which the first internal conductor and the second internal conductor face each other with at least one of the plurality of insulating layers interposed therebetween.

4. The electronic component according to claim 1, wherein the predetermined surface is a mounting surface of the laminate.

5. An electronic component comprising:
   a laminate including a plurality of insulating layers laminated on each other;
   a first internal conductor embedded in the laminate and including a first exposed portion exposed between respective ones of the plurality of insulating layers at a predetermined surface of the laminate; and
   a first plated external electrode provided directly on the predetermined surface by direct plating so as to cover the first exposed portion; wherein
   the first external electrode includes an outer peripheral edge that is spaced away from the first exposed portion by about 0.8 μm or more;
   the first exposed portion is arranged closer to the outer peripheral edge of the first external electrode than any other exposed portions of internal conductors embedded in the laminate;
   the first internal conductor is provided on at least one of ridge lines of the laminate at which respective sides of the laminate are connected; and
   among the ridge lines of the laminate, the first external electrode is provided only on the at least one ridge line on which the first internal conductor is provided.

6. The electronic component according to claim 5, further comprising:
   a second internal conductor embedded in the laminate and including a second exposed portion exposed between respective ones of the plurality of insulating layers at a predetermined surface of the laminate; and
   a second plated external electrode provided directly on the predetermined surface by direct plating so as to cover the second exposed portion; wherein
   the second external electrode includes an outer edge that is spaced away from the second exposed portion by about 0.8 μm or more.

7. The electronic component according to claim 6, wherein the first internal conductor and the second internal conductor define a capacitor at a location at which the first internal conductor and the second internal conductor face each other with at least one of the plurality of insulating layers interposed therebetween.

8. The electronic component according to claim 5, wherein the predetermined surface is a mounting surface of the laminate.

* * * * *